United States Patent [19]
Shibuya et al.

[11] Patent Number: 5,803,444
[45] Date of Patent: Sep. 8, 1998

[54] COILED WAVE SPRING AND PRODUCTION METHOD THEREOF

[75] Inventors: Minoru Shibuya, Chiba; Masayoshi Shimoseki, Tokyo; Minoru Sawayama; Seiichi Inukai, both of Kyoto, all of Japan

[73] Assignees: Mitsubishi Steel Mfg. Co., Ltd.; Mitsubishi Jidosha Kogyo Kabushiki Kaisha, both of Tokyo, Japan

[21] Appl. No.: 812,004

[22] Filed: Mar. 5, 1997

[30] Foreign Application Priority Data

Mar. 12, 1996 [JP] Japan ................................. 8-054704
Feb. 13, 1997 [JP] Japan ................................. 9-028958

[51] Int. Cl.$^6$ ................................................. F16F 1/06
[52] U.S. Cl. ................................. 267/180; 29/896.9
[58] Field of Search .............................. 267/161, 162, 267/166, 180, 181, 182, 286; 29/896.9, 896.91, 896.92, 896.93

[56] References Cited

U.S. PATENT DOCUMENTS 2,818,051 12/1957 Graham ........................... 267/180 X
2,982,323 5/1961 Vosshol et al. .................. 267/180 X
5,558,393 9/1996 Hawkins et al. .................. 267/180

*Primary Examiner*—Lee W. Young
*Attorney, Agent, or Firm*—Flynn, Thiel, Boutell & Tanis, P.C.

[57] ABSTRACT

A coiled wave spring obtained by winding a corrugated wire into a coil shape, wherein mutually overlapping top portions and mutually overlapping base portions of the spring are in mutual contact and predetermined gaps are defined between mutually overlapping slope portions which connect the top and base portions, the first loop of the spring, that is, on the upper side, and the second loop, that is, on the lower side, are in mutual contact in an axial direction thereof only between the top portions and between the base portions, and the gaps are defined between the slope portions to prevent mutual contact. When the spring receives a load and undergoes deformation, the top portions and the base portions come into mutual contact, respectively, but hardly generate friction. Since the gaps are defined between the mutually overlapping slope portions, friction does not occur at these portions, either.

16 Claims, 3 Drawing Sheets

COILED WAVE SPRING AND PRODUCTION METHOD THEREOF

BACKGROUND OF THE INVENTION

1. Field of the Invention

This invention relates to an improvement in a coiled wave spring produced by winding a wire having alternately top portions and base portions, that is, a wire shaped into a corrugation shape, into a coil shape, and a production method of such a coiled wave spring.

2. Description of the Prior Art

A typical example of the coiled wave springs that have been utilized in the past is shown in FIG. 5, and springs produced by overlappingly winding square wire-like spring materials have been used mostly. These springs include the type wherein the top portions and the base portions have flat portions a as shown in FIG. 6 and the type wherein they have curve shape portions b as shown in FIG. 7. FIGS. 8 and 9 show the case where these spring materials are superposed into two stages, respectively. In either case, each winding part, that is, a first loop on the upper side and a second loop on the lower side, are in contact substantially throughout the full surface, and form the shape of a loop. When such coiled wave springs receive a load and undergo elastic deformation, the contact portions come into mutual frictional contact, so that they exhibit more complicated load-deformation characteristics than one simple spring. For example, they exhibit the characteristics having so-called large "hysteresis" having large different characteristics between the compression process and the restoration process. Therefore, when such coiled wave springs are assembled into various machines, design of the spring specification to obtain desired characteristics becomes extremely difficult.

This problem can be solved by forming a spring from a single loop-like sheet metal, but another problem develops. In other words, wastes of disk-like shape are generated when punching out the sheet metal into the loop shape, and post-treatments such as hardening becomes necessary in order to impart flexibility to the sheet metal so punched out, so that the production cost becomes higher. The coiled wave spring has the advantage that it can be produced by far economically than such a single spring because it can be produced by merely deforming a commercially available square wire, to which flexibility has been imparted in advance, into a corrugation shape and winding it into the coil shape. Still another problem is that the outer diameter of the spring must be increased so as to obtain desired characteristics by one loop-like spring, and a fitting space becomes greater.

SUMMARY OF THE INVENTION

The present invention aims at providing a spring, and a production method thereof, which can solve the problems described above, can exhibit load-deformation characteristics similar to those of one loop-like spring, though it is a coiled wave spring, and can be designed easily.

The present invention provides a coiled wave spring produced by winding a corrugated wire into a coil shape having a predetermined radius with a virtual axis as the center, comprising: a plurality of base portions; a plurality of top portions protruding from the base portions in an extending direction of the virtual axis; and a plurality of sloping portions connecting the top portions to the base portions, wherein the top portions overlapping one another and the base portions overlapping one another in the extending direction of the axis are in mutual contact, respectively, and predetermined gaps are defined between the slope portions overlapping mutually in the extending direction of the axis.

In one feature, a first loop of the spring, that is, a loop on the upper side, and a second loop, that is, a loop on the lower side, keep contact with one another in the direction of the virtual axis at only their top portions and their base portions, but are out of contact because the gaps are defined between the loops at the slope portions. When the spring receives a load and undergoes deformation, the top portions come into mutual contact and the base portions also come into mutual contact but friction hardly occurs. Because the gaps are defined between the loops at the slope portions, friction does not either occur. In other words, mutual friction does not occur between the mutually overlapping loops and the spring undergoes elastic deformation. Accordingly, the coiled wave spring according to the present invention can exhibit the load-deformation characteristics analogous to those of a single spring or to those of a spring produced by merely juxtaposing two springs.

Another feature of the coiled wave spring according to the present invention resides in that the top portions and/or the base portions have a flat shape in an imaginary plane which extends along the extending direction of the wire and is parallel to the virtual axis, and the flat portions of the mutually overlapping top and/or base portions have mutually different length. For example, in the loop on the upper side, the flat portion at the top portion has a greater length and the flat portion at the base portion has a smaller length. Further, in the loop on the lower side, the flat portion has a smaller length at the top portion and has a greater length at its base portion. According to this arrangement, the gaps described above can be formed easily, and the size of the gaps can be set by suitably adjusting the length of each flat portion. Further, in order to obtain the same load-deformation characteristics throughout the full length of the spring of the present invention and to more effectively accomplish the objects of the present invention described already, the loop on the upper side and the loop on the lower side preferably have a mutually symmetric shape with respect to an imaginary plane which is perpendicular to the virtual axis. In other words, the length of the top flat portion of the loop on the upper side and the length of the base flat portion of the loop on the lower side are equal to each other, and the length of the base flat portion of the loop on the upper side and the length of the top flat portion of the loop on the lower side have the mutually equal length.

According to a still further embodiment of the present invention, the top portions and/or the base portions have a curve shape in an imaginary plane which extends along the extending direction of the wire and is parallel to the virtual axis, and the curvatures of the curve portions of the mutually overlapping top and/or base portions have mutually different. For example, in the loop on the upper side, the radius of curvature is great (i.e., the curvature is small) at the top portions and the radius of curvature is small (i.e., the curvature is great) at the base portions, while in the loop on the lower side, the radius of curvature is small (i.e., the curvature is great) at the top portions and the radius of curvature is great (i.e., the curvature is small) at the base portions. According to this structure, the gap can be formed easily, and the sizes of the gaps can be easily set by suitably adjusting each curvature. To obtain the same load-deformation characteristics throughout the full length of the spring of the present invention, the loop on the upper side and the loop on the lower side preferably have a symmetric shape with respect to an imaginary plane which is perpendicular to the virtual axis. More specifically, the curvature of the curve shape portion at the top portion of the loop on the upper side and the curvature of the curve shape portion at the base portion of the loop on the lower side are set equal, and the curvature of the curve shape portion at the base portion of the loop on the upper side and the curvature of the curve shape portion at the top portion of the loop on the lower side are set equal.

It is still another feature of the coiled wave spring of the present invention that the gaps defined between the top portions and the bottom portions adjacent to one another are kept throughout substantially the whole process of the elastic deformation of the spring. According to this feature, the spring of the present invention can keep load-deformation characteristics which are analogous to the load-deformation characteristics of one spring, not only in a specific deformation process but throughout the whole process. To constitute such a spring, the gap must be relatively great so that even when the spring undergoes great deformation due to the load, the gaps can be reliably maintained. Incidentally, the sizes of these gaps can be suitably set by adjusting the shapes of the top portions and the base portions as described already. In other words, large gaps can be secured by increasing the difference of lengths between the long flat portions and the short flat portions or by increasing the difference of curvature between the portions having a small curvature and the portions having a large curvature.

Furthermore, the present invention provides a production method of the coiled wave spring described above. The production method of the coiled wave spring of the present invention comprises the steps of:

shaping a wire into a corrugation shape having a plurality of top portions, a plurality of base portions and a plurality of slope portions connecting the top portions and the base portions;

bending the wire into a coil shape having a predetermined radius with a virtual axis being the center; and cutting the wire in such a manner as to constitute a coil with at least two loops, such as a double-coil with two loops, wherein a plurality of the top portions, the base portions and the slope portions are formed in such a manner that the top portions overlapping one another in the axial direction and the base portions overlapping one another in the axial direction are in mutual contact, and predetermined gaps are defined between the slope portions mutually overlapping in the axial direction.

DETAILED DESCRIPTION OF THE PREFERRED EMBODIMENTS

Figure 1:
FIG. 1 is an expansion view of the wave shape of a spring according to an embodiment of the present invention.
Figure 2:
FIG. 2 is an expansion view of the wave shape of a spring according to another embodiment of the present invention.
Figure 3:
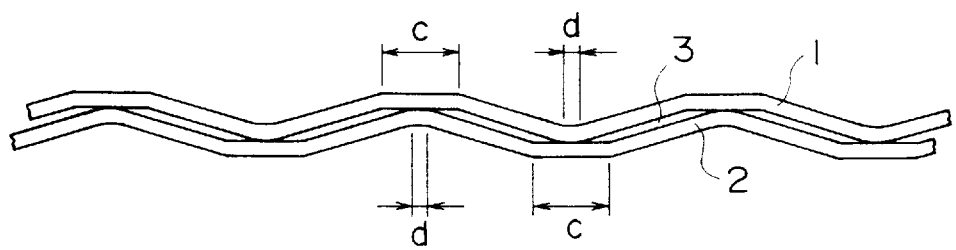
FIG. 3 is an expansion view showing the overlapping state of the spring using the wave shape shown in FIG. 1.
Figure 4:
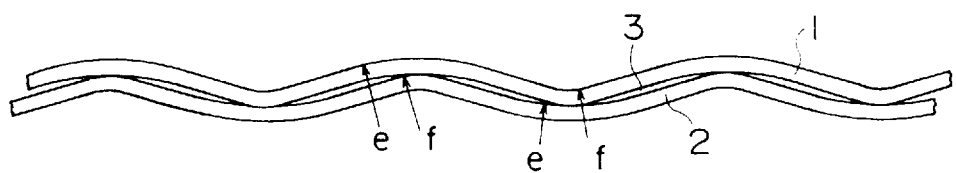
FIG. 4 is an expansion view showing the overlapping state of the spring using the wave shape shown in FIG. 2.
Figure 5:
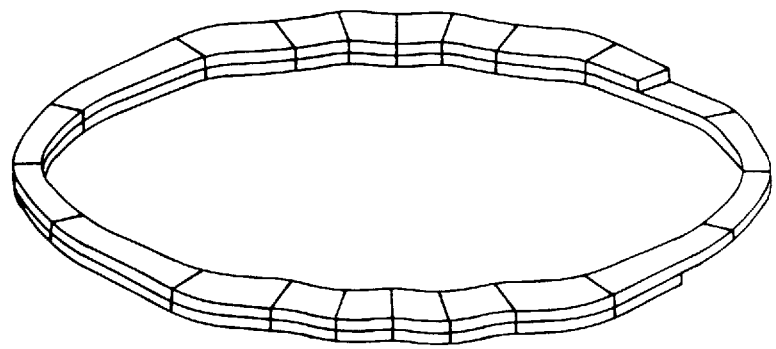
FIG. 5 is a perspective view showing a conventional coiled wave spring.

Hereinafter, concrete embodiments of the present invention will be explained. The coiled wave spring according to the present invention is produced by shaping a long square wire, to which spring characteristics have been imparted in advance, into a corrugated shape having alternately top portions and base portions while interposing slope portions between them, winding simultaneously the wire material into a coil shape having a predetermined radius and thereafter cutting the wire in such a manner as to constitute a double-coil. FIGS. 1 and 3 show the first embodiment wherein the top portion and the base portion have a flat shape, and FIGS. 2 and 4 show the second embodiment wherein they have a curve shape.

In the first embodiment shown in FIGS. 1 and 3, the first loop (i.e., the loop positioned on the upper side) is designed so that the length c of the flat portion of the top portion is longer than the length d of the flat portion of the base portion. On the contrary, the second loop (i.e., the loop positioned on the lower side) is designed so that the length of the flat portion of the top portion is shorter than that of the base portion. The wire material is then wound while the top portions of both loops and their base portions are overlapped to keep mutual contact, respectively, as shown in FIG. 3.

Figure 6:
FIG. 6 is an expansion view showing a wave shape of the conventional coiled wave spring.
Figure 7:
FIG. 7 is an expansion view showing a wave shape of the conventional coiled wave spring.
Figure 8:
FIG. 8 is an expansion view showing the overlapping state of the spring using the wave shape shown in FIG. 6.
Figure 9:
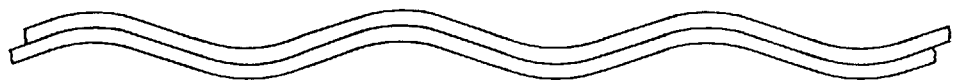
FIG. 9 is an expansion view showing the overlapping state of the spring using the wave shape shown in FIG. 7.
Figure 10:
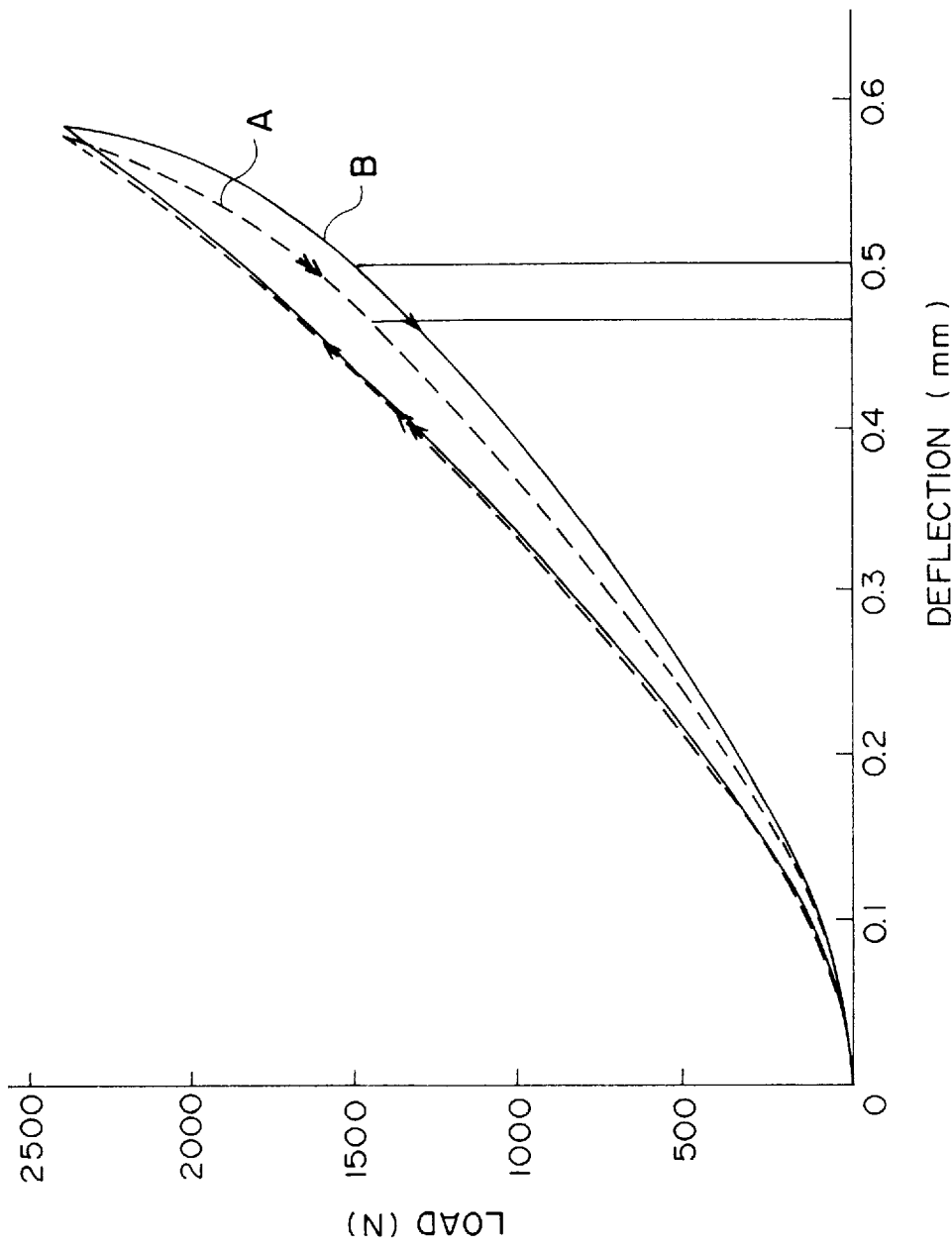
FIG. 10 is a diagram showing load-deflection characteristics of a spring according to the present invention and those of a conventional spring.

In FIG. 3, the flat portion of the top portion of the upper loop 1 and the flat portion of the base portion of the lower loop 2 have the same length c, the flat portion of the base portion of the upper loop 1 and the flat portion of the top portion of the lower loop 2 have the same length d, and gaps 3 are defined between the slope portions of both loops. In the embodiment shown in FIGS. 1 and 3, the length c is 5 mm, the length d is 1 mm, the pitch of the wave shape, that is, wavelength, is 20 mm, and the overall height of winding of two loops is 3.40 mm. The intervals of the gaps 3 at this time are 0.4 mm. When the spring A having such a shape according to the present invention and the conventional spring B shown in FIGS. 6 and 8 described above and having the same outer size as that of the spring A were subjected to the load-deflection characteristics test, the result shown in FIG. 10 could be obtained. As to the spring characteristics near a load 1,500N, for example, the difference between the compression process and the restoration process is about 190N for the spring A and is about 310N for the spring B. In other words, the decrease of about 40% could be obtained in the spring A in comparison with the spring B.

Next, the second embodiment of the invention will be explained. As shown in FIGS. 2 and 4, the loop on the upper side is designed so that the curvature e of the curve portion of the top portion is small while the curvature f of the curve portion of the base portion is great. As to the next loop on the lower side, however, the curvature of the curve portion of the top portion is are at and the curvature of the curve portion of the base portion is small, contrary to the above. Both loops are superposed and wound while the top portions of both loops and their base portions keep mutual contact, respectively, as shown in FIG. 4. In the drawing, the curve portion of the top portion of the upper loop 1 and the curve portion of the base portion of the lower loop 2 have the same curvature e, the curve portion of the base portion of the upper loop 1 and the curve portion of the top portion of the lower loop 2 have the same curvature f, and the gaps 3 are defined between the slope portions of both loops.

As described above, the present invention can effectively solve the problems of the conventional coiled wave springs and can obtain a compact spring having excellent spring characteristics. Effectiveness of the spring according to the present invention can be exhibited sufficiently when applied particularly to return springs, etc, of clutch devices of automatic transmissions of automobiles.

According to the coiled wave spring of the present invention, the mutually overlapping loops undergo elastic deformation without generating mutual friction, and the load-deformation characteristics equivalent to those of a single spring or to those of two springs that are merely juxtaposed with each other can be obtained. For this reason, the design of the spring becomes easier. Furthermore, the gaps of the spring can be formed easily and advantageously.

According to the present invention, further, the coiled wave spring can be designed more easily, and the range of its application to various machines can be further expanded.

What is claimed is:

1. A coiled wave spring produced by winding a corrugated wire into a coil shape having a predetermined radius with a virtual axis as the center, comprising: a plurality of base portions; a plurality of top portions protruding from said base portions in an extending direction of said virtual axis; and a plurality of sloping portions connecting said top portions to said base portions, wherein said top portions overlapping one another and said base portions overlapping one another in the extending direction of the axis are in mutual contact, respectively, and predetermined gaps are defined between said slope portions overlapping mutually in the extending direction of said axis.

2. The coiled wave spring according to claim 1, wherein said top portion of a first loop of said spring and said top portion of a second loop of said spring are in mutual contact, and said base portion of the first loop and said base portion of the second loop are in mutual contact.

3. The coiled wave spring according to claim 2, wherein said top portion of the first loop and said top portion of the second loop have flat shapes having mutually different lengths in an imaginary plane which extends along the extending direction of said wire and is parallel to said virtual axis.

4. The coiled wave spring according to claim 2, wherein said base portion of the first loop and said base portion of the second loop have flat shapes having mutually different lengths in an imaginary plane which extends along the extending direction of said wire and is parallel to said virtual axis.

5. The coiled wave spring according to claim 2, wherein said top portion of the first loop and said top portion of the second loop have flat shapes having mutually different lengths and said base portion of the first loop and said base portion of the second loop have flat shapes having mutually different lengths, in an imaginary plane which extends along the extending direction of said wire and is parallel to said virtual axis.

6. The coiled wave spring according to claim 5, wherein the length of the flat shape portion at said top portion of the first loop is set equal to the length of the flat shape portion at said base portion of the second loop, and the length of the flat shape portion at said base portion of the first loop is set equal to the length of the flat shape portion at said top portion of the second loop.

7. The coiled wave spring according to claim 2, wherein said top portion of the first loop and said top portion of the second loop have curve shapes having mutually different curvatures in an imaginary plane which extends along the extending direction of said wire and is parallel to said virtual axis.

8. The coiled wave spring according to claim 2, wherein said base portion of the first loop and said base portion of the second loop have curve shapes having mutually different curvatures in an imaginary plane which extends along the extending direction of said wire and is parallel to said virtual axis.

9. The coiled wave spring according to claim 2, wherein said top portion of the first loop and said top portion of the second loop have curve shapes having mutually different curvatures and said base portion of the first loop and said base portion of the second loop have curve shapes having mutually different curvatures, in an imaginary plane which extends along the extending direction of said wire and is parallel to said virtual axis.

10. The coiled wave spring according to claim 9, wherein the curvature of the curve shape portion at said top portion of the first loop and the curvature of the curve shape portion at said base portion of the second loop are set equal, and the curvature of the curve shape portion at said base portion of the first loop and the curvature of the curve shape portion at said top portion of the second loop are set equal.

11. The coiled wave spring according to claim 1, wherein said gaps are maintained throughout substantially the whole process of elastic deformation of said spring.

12. The production method of a coiled wave spring comprising the steps of:

shaping a wire into a corrugation shape having a plurality of top portions, a plurality of base portions and a plurality of slope portions connecting said top portions and said base portion;

bending said wire into a coil shape having a predetermined radius with a virtual axis as the center; and cutting said wire in such a manner as to constitute a coil with at least two loops;

wherein a plurality of said top portions, said base portions and said slope portions are formed so that said top portions overlapping with one another in said axial direction and said base portions overlapping with one another in said axial direction are in mutual contact, respectively, and predetermined gaps are defined between said slope portions overlapping with one another in said axial direction.

13. The production method of a coiled wave spring according to claim 12, wherein said top portion is shaped so that it has at portion in an imaginary plane which extends along the extending direction of said wire and is parallel to said virtual axis.

14. The production method of a coiled wave spring according to claim 12, wherein said base portion is shaped so that has a flat portion in an imaginary plane which extends along the extending direction of said wire and is parallel to said virtual axis.

15. The production method of a coiled wave spring according to claim 12, wherein said top portion is shaped so that it has a curve shape in an imaginary plane which extends along the extending direction of said wire and is parallel to said virtual axis.

16. A production method of a coiled wave spring according to claim 12, wherein said base portion is shaped so that it has a curve shape in an imaginary plane which extends along the extending direction of said wire and is parallel to said virtual axis.

* * * * *

UNITED STATES PATENT AND TRADEMARK OFFICE
CERTIFICATE OF CORRECTION

PATENT NO. : 5 803 444
DATED : September 8, 1998
INVENTOR(S) : Minoru SHIBUYA et al It is certified that error appears in the above-identified patent and that said Letters Patent is hereby corrected as shown below:

Column 6, line 48;  change "has at portion" to
                    ---has a flat portion---.

Column 6, line 53;  change "so that has a flat" to
                    ---so that it has a flat---.

Signed and Sealed this

Fifteenth Day of December, 1998

Attest:

BRUCE LEHMAN

*Attesting Officer*          *Commissioner of Patents and Trademarks*